Dec. 9, 1930.  J. A. MILLER ET AL  1,784,462
METHOD OF PRODUCING GROUND RAW MATERIAL FOR PORTLAND CEMENT MANUFACTURE
Filed May 10, 1927  2 Sheets-Sheet 2
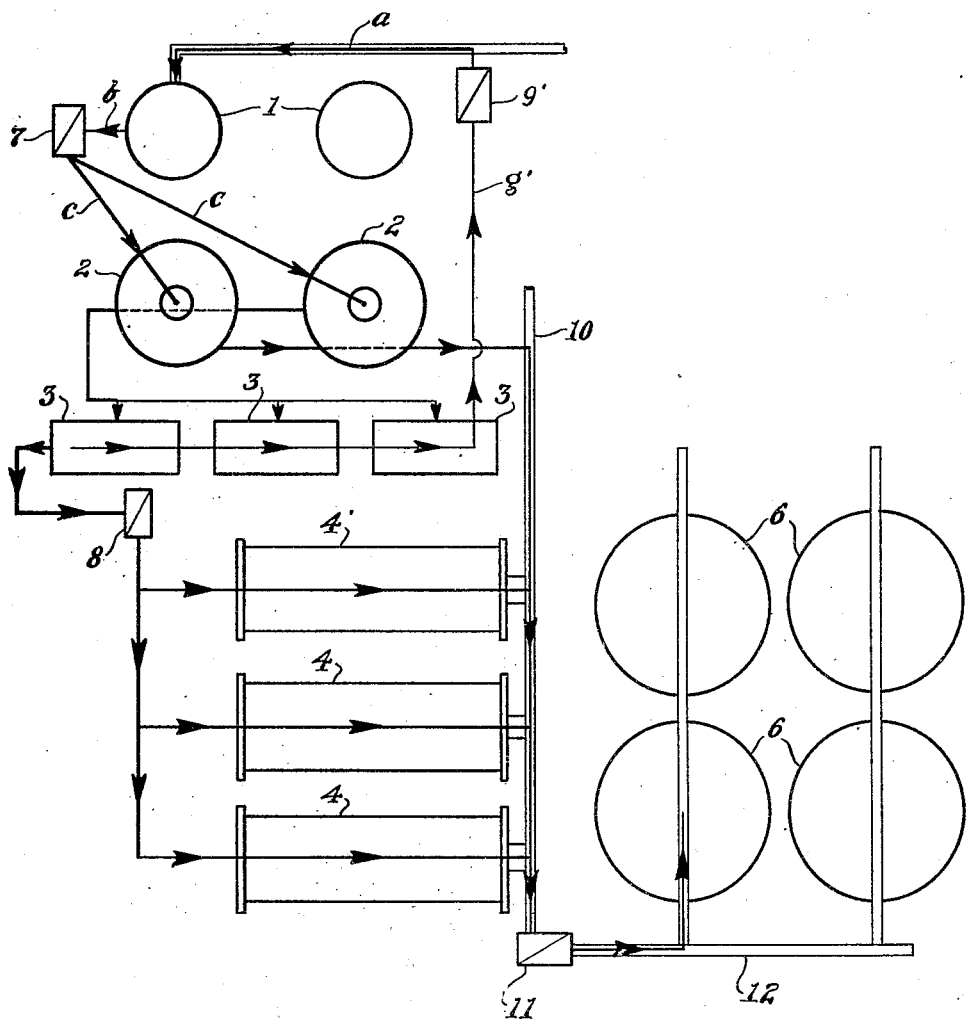

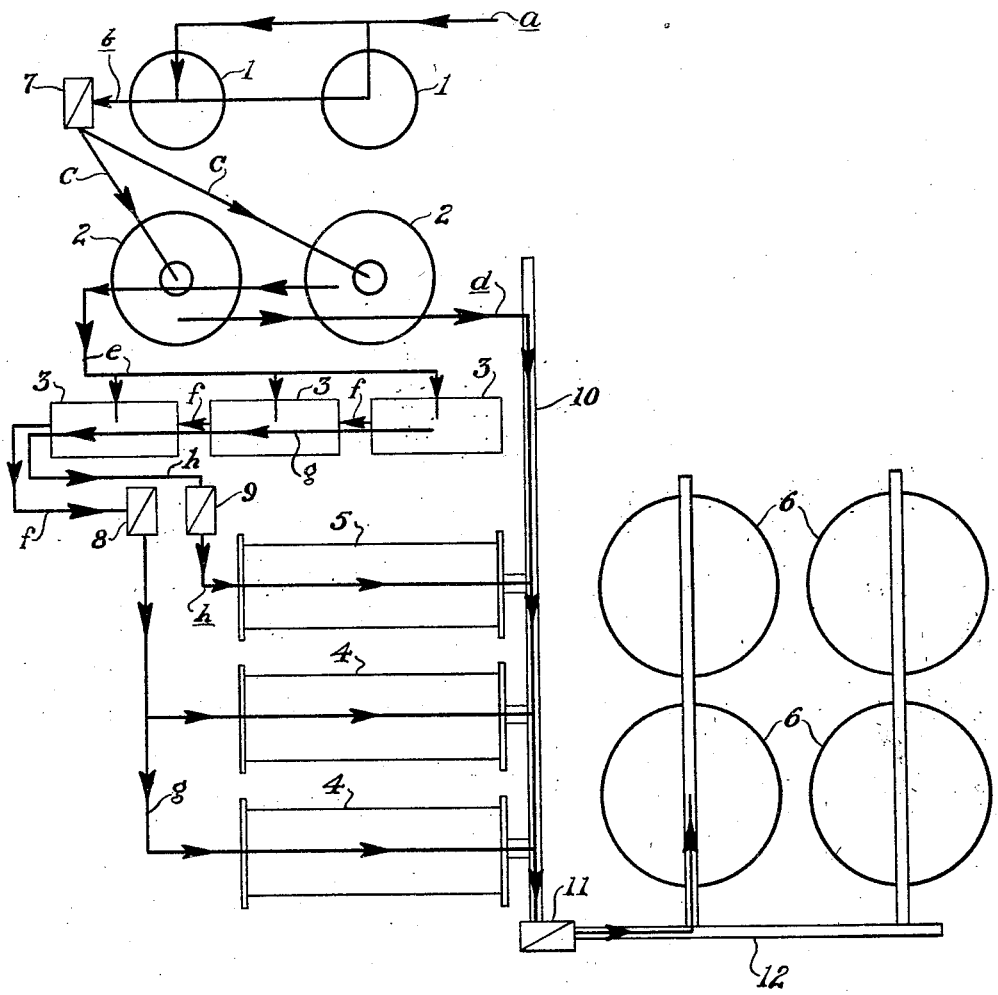

Patented Dec. 9, 1930

1,784,462

UNITED STATES PATENT OFFICE

JOHN A. MILLER, OF NAZARETH, PENNSYLVANIA, AND EDMUND PAUL NEWHARD, OF KINGSPORT, TENNESSEE

METHOD OF PRODUCING GROUND RAW MATERIAL FOR PORTLAND-CEMENT MANUFACTURE

Application filed May 10, 1927. Serial No. 190,345.

Our invention relates to an improved method of grinding the raw materials used for the production of Portland cement.

By our improved method we effect substantial economies in the cost of raw grinding as will be hereafter explained. Not only are we enabled to effect the grinding of the raw materials more economically than heretofore, but the improved ground raw material when burned in the usual way in a kiln results in the production of a more friable clinker which is capable of being more readily and cheaply ground than at present. As a result of our improved method we obtain Portland cement as an ultimate product which is of superior and uniform quality.

It has been recognized for many years in the cement industry that the three principal factors in the making of a Portland cement clinker are, first, the fineness of grinding of the raw materials, second, the temperature of burning in the kiln, and, third, the length of time of burning. These three factors have been expressed as a mathematical equation: $F-T-t=C$, in which F represents the fineness of the raw materials, T the temperature, and $t$ the time of burning; C is a constant representing the clinker. By the application of this formula the temperature may be decreased by a proportionate increase in the time of burning; or conversely the time of burning may be reduced by a proportionate increase in temperature. The temperature and burning time are functions of the kiln itself, but on the other hand the equation is also governed by the value representing fineness of raw materials which tends to lower the requirements in time of burning or in temperature or in both as its value increases.

Under present conditions of operation the manufacture of Portland cement involves the grinding of the raw materials to a sufficient degree of fineness as to permit a certain percentage thereof to pass a 200 mesh sieve, this percentage varying somewhat for different plants and with different raw materials. For example, a raw mixture consisting of limestone and shale may require at a given plant that 85% of the raw mixture shall pass a 200 mesh sieve in order to produce a sound clinker. At another plant the proper combination may occur in the kiln when a lower percentage of the ground material will pass through a 200 mesh sieve. Experience in each plant determines the extent to which the mixture must be ground to permit a sound clinker to be obtained, principally governed by the character of the raw material. A large expenditure of power is required for the raw grinding, this being generally effected by the use of tube mills, and the material must be discharged from the mills at an economical rate which allows in all cases a certain, definite and predetermined percentage of the grains or particles to be of larger than 200 mesh size.

In the example cited above with 85% under 200 mesh there would be 15% of residue on the latter, some of which residue in practice would not pass a 100 mesh sieve. We have ascertained by experiment with raw materials composed of a mixture of limestone and shale that when ground sufficiently fine to permit 85% thereof to pass a 200 mesh sieve the resulting ground raw produce contains approximately 50% of impalpable flour, while 15% thereof is too large to pass a 200 mesh sieve, and as stated some of this residue contains particles or grains larger than one hundred mesh.

Flour in the cement industry has been arbitrarily defined as that portion of the material which is capable of being carried away by a vertical current of air having a velocity of approximately thirty mm. per second. The impalpable character of the flour is indicated by the fact that the average diameter of the largest particle therein of specific gravity 3.1 is .0008 inch or .02 mm.

With such a finely ground material as we have indicated containing a substantial proportion of flour as well as relatively coarse particles, the practice has been to maintain in the kiln a sufficiently high temperature or to allow a sufficient burning time for combination of the larger grains. Our experiments and observations apparently indicate that the presence of a relatively large percentage of flour in the ground mass renders more difficult the combination of the larger grains for the reason that the particles of flour are very highly reactive on account of the fine state of subdivision in which they exist, and this is especially so as we will later point out where the clay or acid constituents of the mixture unduly predominate in the flour. By reason of its fine subdivision the flour fuses more readily and the presence of this low fusing magma in the kiln retards burning of the larger particles and increases the fuel cost of the operation. This is accentuated by the fact that the flour as a whole or in any event its finer particles tend to form rings and balls within the kiln to thereby isolate and make more difficult the burning of the larger particles as well as to disintegrate the coating or lining of the kiln, and in general to prevent uniform burning conditions. These difficulties are reflected in undesirable quality of the final product and in increased cost of coal.

From what we have heretofore said it will be seen that the presence of an undue proportion of impalpable flour is objectionable because of difficulties in connection with the kiln operation, whereas the presence of coarse grains above 200 or 100 mesh size is objectionable on account of the likelihood of imperfect burning thereof with consequent detriment to the quality of the finished product. Yet under existing practices a large percentage of flour is inevitable since the material is subjected to a progressive and continuous reduction in size. At the same time it would be undesirable to continue the grinding further than necessary on account of the expense involved and the increase in the percentage of flour, and hence under existing conditions the presence of the large coarse grains referred to is also inevitable.

A very striking example of mixtures where relatively great percentages of flour are produced are those made from limestone and shale or limestone and clay. The limestone as a rule is a dense crystalline refractory substance, while the clays and shales are readily reduced and build up an excess of the clay element in the 200 mesh material contained in the product of the preliminary mills. A characteristic instance with a mixture consisting of limestone 96% $CaCO_3$, and shale 25% $CaCO_3$, is the following:

| Mesh | | Per cent | Per cent $CaCO_3$ |
|---|---|---|---|
| Fines | 200 passing | 38.10 | 71.1 |
| | 200 residue | 11.70 | 82.0 |
| | 100 residue | 2.80 | 83.8 |
| Coarse grains | 80 residue | 16.00 | 83.7 |
| | 50 residue | 18.20 | 85.2 |
| | 20 residue | 13.20 | 84.8 |

Average composition, 79.1% $CaCO_3$.

The foregoing illustrates the relationship between the size of grains and the chemical composition. The limestone predominates in the coarser part of the mixture, having offered the greatest resistance to grinding, while the shale or acid elements predominate in the material passing the 200 mesh sieve. In other words there has been a mechanical separation with respect to the size of grains of the two ingredients as well in effect as a chemical separation as indicated by the relatively high $CaCO_3$ content of the coarse grains and the relatively low $CaCO_3$ content of the fine grains.

In the passage through the tube mills under the present practice where the final raw grinding is effected these sizes are proportionately reduced, and while the crushing action will further reduce the larger grains during pulverization there will naturally be a continued reduction of the fines with the consequence that the mixture fed to the kiln retains the same characteristics as shown by the product of the preliminary mill, namely, with the limestone remaining relatively coarse while the finer and more reactive portion of the mixture is deficient in lime.

We have found in fact that the deficient lime content of the flour in the ground mixture increases the tendency to form balls and rings during the burning operation with the objections above indicated.

In order to illustrate the grading of particles with regard to the chemical composition, a physical and chemical analysis is shown of a composite sample of tube mill product made up of hourly samples of tube mills and extending through a period of six months, the mixture being limestone and shale.

*Physical analysis*

Fineness: Per cent
  100 mesh residue ......................................... 3.7
  200 mesh residue ......................................... 11.3
  200 mesh passing ......................................... 85.0
Flour as determined by air analyser 52.8%.

*Chemical analyses of separated sizes*

| | A Original sample | B 100 mesh residue | C 200 mesh residue | D Passing 200 mesh |
|---|---|---|---|---|
| Silica | 13.46 | 11.66 | 10.62 | 13.62 |
| Alumina | 4.56 | 3.64 | 3.86 | 5.47 |
| Iron oxide | 1.64 | 1.32 | 1.18 | 1.69 |
| Calcium carbonate | 78.66 | 82.10 | 83.22 | 77.57 |
| Magnesium carbonate | 2.15 | 1.95 | 1.93 | 1.68 |

As shown above the composite mixture contained 52.8% of flour. The residue from the air separation contained 82.0% $CaCO_3$. The material passing the 200 mesh and represented by analysis D consisted of the following constituent portions:

|  | Per cent | Per cent |
|---|---|---|
| Larger particles | 32.2 | $CaCO_3$ 80.6 |
| Flour | 52.8 | $CaCO_3$ 75.7 |
| Total 200 mesh grains | 85.0 | $CaCO_3$ 77.5 |

The arrangement of particles may be understood more concisely by a division of the sample into two portions, namely, particles capable of separation by the air analyzer (flour) and the heavier particles constituting the residue after the air separation has been completed:

|  | Per cent | Per cent |
|---|---|---|
| Flour | 52.8 | $CaCO_3$ 75.7 |
| Residue | 47.2 | $CaCO_3$ 82.0 |

The foregoing analyses serve in a general way to show the natural grading of the particle sizes during the grinding of the limestone-shale mixture. The entire mass of grains remains of course in a state of intimate contact during the process of grinding and burning and the mass as a whole is also of the correct predetermined chemical proportions. The fact nevertheless is that the finer grains are more reactive, are deficient in lime and combine at low temperatures in the kiln to form clinker compounds which are not consistent with the desired true composition of the mixture.

Furthermore, under present conditions as above indicated, the clinker is not only inferior in quality but usually segregates badly when spilled on storage piles thereby causing substantial fluctuations in the power required for grinding and making it necessary that the power used shall be capable of taking care of extreme peak conditions. Furthermore the variations in the clinker generally are reflected as corresponding variations in the resulting cement. To sum up the situation, we find that the effect of variation in particle sizes of the raw cement mixture has a definite influence not only on kiln efficiency but also on clinker grinding costs and on the quality of the finished product.

The conditions above described are principally encountered in connection with the manufacture of Portland cement where the raw mixture is composed of two or more dissimilar materials. The limestone and clay mixtures are typical of this class, the two ingredients differing widely in chemical and physical properties, especially in the case of high calcium limestones. Where argillaceous limestones or calcareous shales are used the variation, though noticeable, is not so pronounced and the opposite extreme is reached in the case of natural cement rocks where there is only a relatively slight difference in the "high" and "low" stone composing the mixture, each grain or particle having a balanced composition or nearly so. Therefore our invention which relates to the grinding of the raw cement mixture in a new and improved way as we will hereafter point out, will find its principal utility in those plants where the mixed raw materials are essentially dissimilar or in other words where the effect of raw grinding is to produce considerable variation in particle sizes of the mixtures and in their chemical constitution. There are special cases where the 200 mesh residue contains grains of silica in the form of quartz, quartzite, or sand, the latter occurring with the raw materials or intentionally added to correct a deficient silica content. In the ordinary process of grinding the latter will have a high grinding resistance and the grains will remain comparatively large. During calcination, the coarse grains of silica can come in contact only on the surface with the lime and there is produced a high silica—low lime ratio around the grain which has a much lower melting point than the usual silica lime—ratio composition of cement and which often results in unsoundness. The raw grinding in such a case is likely to be costly on account of having to reduce the entire mixture to a high fineness in order to properly reduce the silica grains, thereby obtaining an unnecessarily large percentage of flour.

As another instance of the need for improving the raw grinding there are cases where raw materials having suitable chemical compositions are nevertheless proved by experience to react unfavorably during calcination and therefore injure the quality of the final product. While actual rejections of these raw materials may not always be made experience has shown that when used they can be handled only in limited proportions. We have reference here to materials that may occur in the same quarry, materials essentially the same in composition but differing substantially in their physical characteristics. As a specific example we have encountered shale from the same quarry consisting of (1) a fine grained soft shale overlying (2) a hard blue, calcareous shale. The soft shale in question has proved to be troublesome to burn when used in the mixture and the resulting cement has but a small margin of strength above the standard requirements. Considerable seasoning of the clinker is also necessary when the soft shale is used on account of unsoundness. However by the employment of the harder calcareous variety of shale, if only to the extent of 50% of the total shale used burning conditions are materially improved and an increase of 25% in tensile strength has been noted. Chemical analyses of the two shales in question are as follows:

|  | Soft shale | Hard shale |
|---|---|---|
| Silica | 57.36 | 43.80 |
| Alumina | 22.78 | 17.52 |
| Iron oxide | 7.98 | 5.92 |
| Titanium oxide | 1.06 | 0.76 |
| Manganese oxide | 0.04 | 0.03 |
| Calcium carbonate | 0.64 | 24.55 |
| Magnesium carbonate | 1.78 | 4.26 |
| Alkalies | 0.90 | 1.90 |
| Loss on ignition | 7.29 | 14.78 |
| Ratio $\frac{SiO_2}{Al_2O_3}$ | 2.56 | 2.50 |
| Ratio $\frac{Silica}{R_2O_3}$ | 1.80 | 1.80 |

It will be seen that the elements exist in both shales in essentially the same proportions, the hard variety of shale having approximately 25% calcium carbonate which reduces the silica, iron and alumina proportionately. There is also an appreciable increase in the magnesia and alkalies in the harder shale, but taken as a whole the differences in the chemical composition are not important enough to account for the differences between the physical characteristics of respective mixtures of limestone and soft shale on the one hand as compared with limestone and both varieties of shale on the other hand and the properties of the resulting clinker and cement in each case. Composite samples of raw mixture representing periods of several months plant operation to cover the two conditions were subjected to an air analysis as follows:

|  | Per cent flour |
|---|---|
| (1) Mixture of limestone and soft shale | 60.5 |
| (2) Mixture of limestone with equal proportions of hard and soft shale | 52.8 |

With the relatively high percentage of flour in the mixture using soft shale alone it is difficult to produce a satisfactory clinker on account of the low fusing point of the mixture while the clinker obtained therefrom is ground with difficulty and under conditions of substantial variations in power used. At the same time the ultimate cement from this mixture is approximately 25% lower in tensile strength than the cement made from a mixture employing hard shale and with a lower percentage of flour as above indicated.

Our experiments have convinced us that the grinding of the raw mixture to the point of producing high percentages of flour is not only useless and expensive but an actual detriment in calcination, in cost of fuel, in cost of clinker grinding, and in the quality of the ultimate product. What we seek to do therefore is to grind the raw materials in such a way as to diminish the percentage of flour of the clay or acid elements and at the same time reduce the grains constituting the 200 mesh residue. From a chemical standpoint we secure a more complete dissemination of the limestone in order that the finest portion of the mixture, namely, the grains capable of separation by the air analyzer shall have a chemical analysis substantially corresponding to the averge composition of the whole. Under our invention all the lime, represented by the limestone grains will be rendered available thereby obtaining more uniform burning conditions in the kiln. In other words bearing in mind the formula $F-G-t=C$, we have added to the value of F by a process of diffusion of the limestone, thereby reducing the coal requirements appreciably and with the other advantages herein indicated.

During the process of calcination the chemical reactions attending clinkering produce considerable heat. These exothermic reactions occur at a critical temperature within the clinkering zone and during the combination of the elements to form the calcium silicates and aluminum silicates of the final product. By more completely diffusing the limestone as explained the chemical reactions in the kiln will be more spontaneous thereby resulting in shorter clinkering zones and obtaining a further reduction of fuel cost.

In order that our invention may be better understood we will now describe an illustrative example of the same as carried out in connection with the so-called dry method from which its application to the wet method will be understood by those skilled in the art, and we assume also the employment as raw materials of limestone and shale although it will be understood that the invention is not limited to these materials. As above pointed out the invention finds its greatest utility in connection with raw materials differing substantially in physical characteristics as is the case with limestone and shale.

In the accompanying drawing forming a part of the present application:

Figure 1 is a diagram of a suitable apparatus which may be employed to carry our improved method into effect, the elements of the apparatus being of standard type and the arrows indicated on the drawings showing the path of the material as will be hereafter described, and Figure 2 a diagram showing a modified form of apparatus.

In these drawings, corresponding parts are represented by the same reference characters.

It will be understood of course that the details of the process will vary for different plants and different raw materials, although the same general principles will apply in all cases. Briefly stated these involve:

1. The elimination of unnecessarily fine material.

2. The special treatment of limestone or other refractory portions of the mixture to effect diffusion, or in other words to prevent the segregation of the lime in undue proportions in certain portions of the mixture with consequent depletion thereof in other portions.

Under our method it is required that the limestone or other refractory material shall be ground exceedingly fine as compared with existing processes while at the same time there shall not be a proportionate production of flour in the shale or softer material as is necessarily a result with such present processes. This can be effected in a number of ways. In the first place the limestone or other refractory material and the shale or other softer material may be ground separately, the grinding of the limestone being carried to the point of materially limiting the number of coarse grains and the grinding of the shale being carried to the point of preventing the production of an undue proportion of flour. Such a plan involves mechanical difficulties with the dry process in properly proportioning the separately ground materials after grinding, although with the wet process the separately ground portions can be easily proportioned through the use of the blending tanks.

A modification of the plan above proposed would be to grind the major portion of the mixture in the usual manner to a normal fineness; afterwards mixing with it either in the blending tanks of the wet process or through the use of screws and bins in the dry process, a reserved portion of the limestone which has been separately ground to an excessive fineness. Successful results under this method will depend upon the obtainment of sufficient flour from the fine grinding operation to supply the deficient lime content of the flour which has been produced from the clay element in the regular grinding operations.

In order to provide a method of general application wherein the best results are secured, we prefer to effect the grinding of the complete mixture by so handling the same as to prevent the undue production of flour in the softer element and the undue production of coarse grains in the harder element, and this we effect by means of an apparatus of the general type illustrated in the drawing.

The apparatus of Figure 1 is assumed to have a grinding capacity of four thousand barrels daily and employing limestone and shale as raw materials, and it will be so described, the quantities hereafter referred to being those attained under conditions of actual practice. It involves comminuters 1, 1 such as Bradley Hercules Mills or other standard type, a pair of air separators 2, 2, three (more or less) vibrating screens 3, 3, 3 of about forty mesh, two (more or less) tube mills 4, 4 one (or more) fine grinding tube mill 5, and four (more or less) blending tanks each indicated by 6. The tube mills are 5 feet by 22 feet in size using steel grinding charges.

The several elements of the apparatus are of sufficient capacity to handle the quantities of material passing through them.

The apparatus also involves an elevator 7 for elevating the product of the comminuters 1 and delivering the same to the air separators 2, 2. It also involves an elevator 8 for elevating the material passing the screens 3, 3, 3 and delivering the same to the tube mills 4, 4. It also utilizes an elevator 9 for elevating the residue or material rejected by said screens and passing it to the tube mill 5.

It also includes a mixing screw 10 for receiving the fine material separated by the air separators 2 as well as the ground material from the tube mills 4, 4 and 5, so as to mix this material in its passage therethrough. The apparatus includes also an elevator 11 for elevating the material discharged by the mixing screw 10 and discharging the same in conveyors 12 to the several tanks 6.

With such an apparatus we carry out our improved method as follows:

The raw mixture consisting of limestone and shale in substantially the correct proportions crushed to one inch size is fed to one of the comminuters 1 as indicated by the arrow line $a$. The second comminuter is used as a reserve so that the process will not be interrupted at this point in case of a breakdown. The preliminary reduction in size of the raw material is effected by the comminuter or other preliminary reducing apparatus, the ground material being discharged to the elevator 7 as indicated by arrow line $b$.

From the elevator 7 the material is discharged to the two air separators as indicated by arrow lines $c, c$, in which an air separation in the usual way takes place. The material of sufficient fineness separated by the air separators is fed to the screw conveyor 10 as indicated by the arrow line $d$, being conveyed by the latter toward the elevator 11. The residue from the air separators is fed to the screens 3 as indicated by arrow lines $e$ by which a screening of the residue will be effected.

The material passing through the screens 3 will be fed to elevator 8 as indicated by arrow lines $f, f$ and by this elevator this material will be delivered to the tube mills 4, 4 as indicated by arrow lines $g$. In these tube mills this material will be subjected to a normal grinding operation to reduce it to a fineness of about 90% minus 200 mesh.

The material rejected by screens 3 is passed to the elevator 9 as indicated by arrow line $g$ and by this elevator 9, as indicated by arrow line $h$, is delivered to the fine grinding tube mill 5. In this portion of the material the hard limestone ingredient of the mixture predominates and in the tube mill 5 this material is reduced to a fineness of about 98% minus 200 mesh or better by providing said tube mill with a close feed adjustment.

It will be understood that the excessive fine grinding referred to may be carried on in mills of other type than tube mills; and if it be found that the material is of such a character as to result in undue wear on the linings and grinding charges of the tube mill 5 due to the very light feed employed, said mill may be operated on the closed circuit principle, the feed being normal and the product being directed to 200 mesh sieves to separate the particles of sufficient fineness, while the rejects of said sieve are returned to the mill, as well known in the grinding and separating art.

From the several tube mills 4, 4 and 5 the ground material is delivered to the mixing screw 10 in which these products together with the fine particles separated by the air separators 2, 2, are thoroughly mixed and delivered to the elevator 11 by which they are distributed to the conduits 12 leading to the blending tanks.

Under conditions of actual experience with a capacity of 4000 barrels per day, each of the comminuters 1 should have a capacity and be supplied with crushed material at the rate of approximately 54 tons per hour. We find that the minus 200 mesh material removed by the air separators 2, 2, constitutes from 30 to 40 per cent of the original feed or a mean of approximately 18 tons per hour, the rejects of these separators approximating 36 tons per hour. The material passing the screens 3, 3, amounts to approximately 28 tons per hour while the material refused by these screens is about 8 tons per hour. In other words, each of the tube mills 4, 4, operates upon practically 14 tons per hour while the fine grinding mill 5 owing to the closeness of its feed adjustment is operating at a much smaller capacity.

It will be noted with our process that the sufficiently fine material separated by the air separators 2 is fed directly to the mixing screw 10, these separators being closely adjusted to effect the separation of minus 200 mesh material constituting as above explained from 30 to 40% of the original feed.

Under present conditions where air separators are used the adjustment is not close and therefore the material separated therein is fed to the tube mills. This fine material which is separated by the air separators consists largely of the softer shale or clay ingredient. By feeding this separated portion directly to the tube mills for grinding therein as in the existing practice the proportion of flour will be very objectionably increased as we have explained.

With our improved method the rejects of the air separation consisting largely of limestone are fed to the tube mills for fine grinding, a considerable proportion of the softer ingredient being withdrawn therefrom by the air separators.

With the usual practice it is customary to allow this fine material to enter the tube mills, thereby not only increasing the volume of feed and so cutting down the capacity of the tube mills, but also increasing the production of flour of the clay element in the tube mill product.

With our improved method we also effect a separation by the screens 3, 3 of the finer from the coarser particles of the rejects from the air separators and we separately grind the separate portions of such rejects. The finer portions passing the screens 3, 3, are subjected to a grinding operation which is not carried to an undue extent, providing for approximately 90% minus 200 mesh material, which will not result in an undue production of flour.

The coarser particles or residue from the screens 3, 3, 3 consist almost wholly of coarse hard limestone grains and these are almost entirely reduced to minus 200 mesh size in order to substantially eliminate any relatively coarse limestone particles which we have found to be a source of objection in the finished product, for the reasons which have been pointed out. The grinding of the limestone to excessive fineness results in the production of the necessary limestone flour to supply the lime deficiency in the flour produced from the shale, or clay, element.

In the operation of our grinding method there will be a certain amount of flour obtained from the softer ingredient during the grinding in tube mills, 4, 4 which will add to the flour obtained during the preliminary grind as taken out by the air separator. Obviously the total amount will not be as great, however, as when the entire proportion of the softer ingredient is allowed to pass through the tube mills. Also there will, of course, be some limestone flour obtained even in the preliminary operation, and an appreciable amount in the tube mills 4, 4. To insure complete dissemination of lime flour we have the operation of fine grinding in tube mill 5 the product of which added to the lime flour naturally obtained in the other phases of the operation will supply the deficiency in the flour from the shale.

In Figure 2, we illustrate a modified apparatus in which our improved method may be carried out, and in which the fine grinding tube mill 5 is dispensed with. This apparatus employs the comminuters 1, 1, the air separators 2, 2, the screens 3, 3, 3, the tube mills 4, 4, and the tanks 6, 6' substantially as in the apparatus first described. In other respects also it is the same with two exceptions:

(1) Instead of employing the fine grinding tube mill 5 for receiving the rejects of the screens 3, 3, 3 by elevator 9, we direct these rejects by elevator 9' back to the comminuters in which they are subjected to a regrinding, the path of these rejects from the screens being shown by the arrow line g'.

(2) Since the fine grinding tube mill 5 is dispensed with, an additional tube mill 4' is employed to take care of grinding requirements. This extra mill 4' is identical in capacity and feed with mills 4, 4.

By returning the rejects of the screens 3 to the comminuters, the hard limestone particles thereof will result in the production of considerable flour, and at the same time the arrangement permits a somewhat coarser screen to be used on the preliminary mill, thus increasing the capacity thereof.

Having now described our invention, what we claim as new therein and desire to secure by Letters Patent is as follows:

1. The process of grinding a mixture of raw materials for the manufacture of Portland cement which consists in subjecting the mixture to a preliminary reduction operation, in subjecting the material so acted upon to the effect of an air separator for removing fine particles therefrom, in subjecting the material rejected by the air separator to a fine grinding operation, and in intimately mixing the finely ground product with the fine material removed by the air separator, substantially as set forth.

2. The process of grinding a mixture of raw materials for the manufacture of Portland cement which consists in subjecting the mixture to a preliminary reduction operation, in separating and withdrawing from the mixture the sufficiently fine particles secured as a result of the preliminary reduction, in subjecting the material rejected in the first separating operation to a second separating operation and in subjecting the relatively fine material separated in the second separating operation to a fine grinding, substantially as set forth.

3. The process of grinding a mixture of raw materials for the manufacture of Portland cement which consists in subjecting the mixture to a preliminary reduction operation, in separating and withdrawing from the mixture the sufficiently fine particles secured as a result of the preliminary reduction, in subjecting the material rejected in the first separating operation to a second separating operation, in subjecting the relatively fine material separated in the second separating operation to a fine grinding, and in intimately mixing the finely ground material with the fine particles removed by the first separating operation, substantially as set forth.

4. The process of grinding a mixture of raw materials for the manufacture of Portland cement, which consists in subjecting the mixture to a preliminary reduction operation, in separating and withdrawing from the mixture the sufficiently fine particles resulting from the first reduction, in subjecting the material rejected by the first separating operation to a second separating operation, in fine grinding the relatively fine material separated in the second separating operation, and in separately fine grinding the relatively coarse material rejected in the second separating operation, substantially as set forth.

5. The process of grinding a mixture of raw materials for the manufacture of Portland cement, which consists in subjecting the mixture to a preliminary reduction operation, in separating and withdrawing from the mixture the sufficiently fine particles resulting from the first reduction, in subjecting the material rejected by the first separating operation to a second separating operation, in fine grinding the relatively fine material separated in the second separating operation, in separately fine grinding the relatively coarse material rejected in the second separating operation, and in intimately mixing the finely ground material resulting from said grinding operations with the fine material resulting from the first separating operation, substantially as set forth.

6. The process of grinding a mixture of raw materials for the manufacture of Portland cement, which consists in subjecting the mixture to a preliminary reduction operation, in separating and withdrawing from the mixture the finely ground particles resulting from the first reduction, in subjecting the material rejected in the first separating operation to a second separating operation, in subjecting the relatively fine material resulting from the second separating operation to a fine grinding operation and in subjecting the material rejected by the second separating operation to a fine grinding operation by which such material is reduced to a higher percentage of fineness than the material separated by the second separating operation, substantially as set forth.

7. The process of grinding a mixture of raw materials for the manufacture of Portland cement, which consists in subjecting the mixture to a preliminary reduction operation, in separating and withdrawing from the mixture the finely ground particles resulting from the first reduction, in subjecting the material rejected in the first separating operation to a second separating operation, in subjecting the relatively fine material resulting from the second separating operation to a fine grinding operation, in subjecting the material rejected by the second separating operation to a fine grinding operation by which such material is reduced to a higher percentage of fineness than the material separated by the second separating operation, and in intimately mixing together the fine particles resulting from the first separating operation and the ground material from the separate grinding operations, substantially as set forth.

8. The process of dry grinding a mixture of raw materials for the manufacture of Portland cement, said mixture comprising at least two ingredients of different hardness such as limestone and shale, which consists in subjecting the mixture to a preliminary reduction operation, in subjecting the mixture resulting from the preliminary reduction to a separating operation whereby sufficiently fine particles will be removed in which the softer ingredient predominates, in subjecting the material rejected by the first separating operation to the action of a second separating operation whereby the material rejected thereby will consist largely of particles of the harder ingredient, and in separately grinding the material separated by the second separating operation and the material rejected by such second separating operation, substantially as set forth.

9. The process of dry grinding a mixture of raw materials for the manufacture of Portland cement, said mixture comprising at least two ingredients of different hardness such as limestone and shale, which consists in subjecting the mixture to a preliminary reduction operation, in then effecting a grading of the material into relatively fine particles and relatively coarse particles, and in separately fine grinding the two separate portions of the material, substantially as set forth.

10. The process of dry grinding a mixture of raw materials for the manufacture of Portland cement, said mixture comprising at least two ingredients of different hardness such as limestone and shale, which consists in subjecting the mixture to a preliminary reduction operation, in then effecting a grading of the material into relatively fine particles and relatively coarse particles, in separately fine grinding the two separate portions of the material, the fine grinding of the coarser particles being regulated to produce a higher percentage of finely ground particles than the grinding of the finer particles, substantially as set forth.

11. The process of dry grinding a mixture of raw materials for the manufacture of Portland cement, said mixture comprising at least two ingredients of different hardness such as limestone and shale, which consists in separating the mixture into two portions, one in which the softer ingredient predominates and the other in which the harder ingredient predominates, in subjecting the first portion of the mixture to a fine grinding operation, and in subjecting the second portion of the mixture to a separate fine grinding operation, in which a greater proportion of finely ground particles is secured, substantially as set forth.

JOHN A. MILLER.
EDMUND PAUL NEWHARD.